United States Patent [19]

Hatanaka et al.

[11] 4,303,572

[45] Dec. 1, 1981

[54] CURABLE COMPOSITION

[75] Inventors: Masayuki Hatanaka, Oura; Atsushi Kurita, Ohta, both of Japan

[73] Assignee: Toshiba Silicone Co., Ltd., Tokyo, Japan

[21] Appl. No.: 187,276

[22] Filed: Sep. 15, 1980

[30] Foreign Application Priority Data

Sep. 20, 1979 [JP] Japan .............................. 54-121403

[51] Int. Cl.$^3$ ...................... C08G 77/12; C08L 83/06
[52] U.S. Cl. .............................. 260/37 SB; 525/475; 525/478; 528/14; 528/15; 528/31
[58] Field of Search .............................. 525/475, 478; 260/37 SB; 528/14, 15

[56] References Cited

U.S. PATENT DOCUMENTS

| | | | |
|---|---|---|---|
| 3,255,152 | 6/1966 | Kniege | 525/475 |
| 3,814,730 | 6/1974 | Karstedt | 525/475 |
| 3,968,055 | 7/1976 | Palmer | 260/37 SB |
| 4,130,707 | 12/1978 | Leiser et al. | 260/37 SB |

FOREIGN PATENT DOCUMENTS 52-77164  6/1977  Japan ................................. 525/478

*Primary Examiner*—Wilbert J. Briggs, Sr.
*Attorney, Agent, or Firm*—Blanchard, Flynn, Thiel, Boutell & Tanis

[57] ABSTRACT

A curable silicone composition comprising 100 parts by weight of polyorganosiloxane containing at least 2 vinyl radicals bonded to silicon atom(s) in the molecule 0.1–10 parts by weight of polyorganohydrogensiloxane containing more than 2 hydrogen atoms bonded to silicon atom(s), on the average, in the molecule, 5–500 parts by weight of fine powder of a transition metal, and a catalytic amount of a platinum catalyst containing no halogen atoms in the molecule.

13 Claims, No Drawings

CURABLE COMPOSITION

The present invention relates to a curable silicone composition. More particularly, the present invention relates to a curable silicone composition containing fine powder of a transition metal, such as tungsten or silver.

Silicones, particularly silicone elastomers, having electric insulating properties, weather resistance, low toxicity, excellent thermal stability and low temperature resistance have been used widely as electrical insulating materials and medical materials. There have been proposed additional uses of the silicones, such as the use thereof as electrical conductors and other specific uses, by incorporating fine powders of various metals therein. For example, silicones containing fine powders of silver or copper can be used as electrical conductors. Silicones containing fine tungsten powder are useful as X-ray shielding materials, contrast media and vibration-proof materials. It is disclosed in the specification of Japanese Patent Publication No. 19878/1978 that if silicones are used as intravascular contrast media, blood coagulation is not caused, which is advantageous. However, silicone rubbers containing a large amount of a transition metal, such as silver or tungsten, could not be produced on a stable, industrially satisfactory basis, according to the prior art procedures.

Silicone elastomers curable by heating can be cured by two methods. One of the curing methods comprises heating a polyorganosiloxane, preferably containing vinyl radicals bonded to silicon atom(s), in the presence of an organic peroxide. The other method comprises heating a polyorganosiloxane containing at least 2 vinyl radicals bonded with silicon atom(s) in the molecule, together with a polyorganohydrogensiloxane containing more than 2 hydrogen atoms (on the average) bonded with silicon atom(s) in the molecule, in the presence of a platinum catalyst. However, a polyorganosiloxane composition containing a transition metal, for example, a fine powder of tungsten, cannot be cured at all. The desired elastomer having sufficient mechanical properties cannot be obtained by the former method in which an organic peroxide is used. In the latter method wherein a platinum catalyst is used, in almost all cases, the platinum is poisoned by the transition metal, whereby the curing effect thereof is reduced in many cases. For example, the composition disclosed in the specification of the aforementioned Japanese Patent Publication No. 19878/1978 is impractical, because even if chloroplatinic acid or an organic peroxide is used, (1) the curing cannot occur at all, (2) the catalyst is poisoned during storage or (3) the catalyst becomes very active and the curing occurs within a short period of time even at room temperature, thereby reducing the processability of the composition. Those phenomena are observed also in silicone elastomer compositions containing fine silver powder.

After intensive investigations for the purpose of solving the problems of poor curing effect and scorching, the inventors have found that silicone elastomers containing fine powder of a transition metal can be obtained by carrying out the latter method, as above described, in the presence of a platinum catalyst containing no halogen atoms, such as chlorine atoms, in the molecule, such as a 0 (zero)-valent platinum-phosphorus complex or platinum acetylacetonato complex. The inventors have found also that this method can be employed for the production of various cured silicone products. The present invention has been completed on the basis of these findings.

The present invention relates to a curable silicone composition comprising:
(A) 100 parts by weight of polyorganosiloxane containing at least 2 vinyl radicals bonded to silicon atom(s) in the molecule,
(B) 0.1 to 10 parts by weight of polyorganohydrogensiloxane containing more than 2 hydrogen atoms bonded to silicon atom(s), on the average, in the molecule,
(C) 5 to 500 parts by weight of fine powder of a transition metal, and
(D) a catalytic amount of a platinum catalyst containing no halogen atoms in the molecule.

The polyorganosiloxane (A) used in the present invention can have only of linear, branched and cyclic siloxane chains in the molecule. In order to cure polyorganosiloxane (A) in the presence of the platinum catalyst (D), at least two vinyl radicals bonded to silicon atom(s) must be contained in the molecule. As other organic radicals that can be bonded to the silicon atoms, there can be mentioned alkyl radicals such as methyl, ethyl, propyl, butyl, hexyl, octyl, decyl and dodecyl radicals; aryl radicals such as phenyl radical; aralkyl radicals such as β-phenylethyl radical; and substituted hydrocarbon radicals such as the 3,3,3-trifluoropropyl radical. Hydroxyl radicals can be contained therein at, for example, the ends of the molecule. Among the above-described organic radicals, other than the vinyl radicals, it is preferred to employ a combination of methyl radicals and phenyl radicals or only methyl radicals, because in such a case, excellent thermal resistance and mechanical properties can be obtained and the starting materials are easily available and synthesized. Particularly, when the cured product is an elastomer, it is preferred to employ only methyl radicals as the organic radicals, other than the vinyl radicals, for cases in which low temperature resistance and radiation resistance are not required. The vinyl radicals contained in the polyorganosiloxane (A) can be bonded to the same or different silicon atoms in the siloxane chain of the molecule.

If the cured product is resinous, its average polymerization degree can be in the relatively low range of from 2 to 40. However, if the cured product is an elastomer, its average polymerization degree should be as high as above 100 in order to obtain an excellent rubber elasticity. Particularly, if the uncured composition is flowable and is used for casting or potting, the average polymerization degree thereof is preferably in the range of 100 to 1,000 and the siloxane chain is linear or branched. A composition in which the molecular terminals are blocked by dimethylvinylsiloxy radicals and the organic radical in the other siloxy units is methyl is preferred, because it can be synthesized easily and the cured product thereof has excellent mechanical properties. When the uncured composition is solid and is molded by press vulcanization or extruding techniques to yield a cured product of excellent mechanical properties, a substantially linear siloxane chain having an average polymerization degree in the range of 1,000 to 10,000, particularly 3,000 to 10,000 is preferred. If the average polymerization degree is higher than 10,000, it is difficult to incorporate the fine transition metal powder (C), reinforcing filler, etc. therein. The number of vinyl radicals bonded with silicon atom(s) in the polyorganosiloxane (A) is in the range of 0.005 to 0.5%, based on the total number of the organo groups. If the amount of the vinyl radical is less than 0.005%, excellent mechanical properties cannot be obtained, and if it is more than 0.5%, the thermal stability is reduced.

The polyorganohydrogensiloxane (B) used in the present invention is a crosslinking agent for the polyorganosiloxane (A). This component (B) can have any of linear, branched and cyclic siloxane chains in the molecule. In order to form a network or three-dimensional structure by crosslinking, more than 2 hydrogen atoms (on the average) bonded to silicon atom(s) are required in the molecule of component (B). As the organic radicals bonded to the silicon atom(s), there can be mentioned those exemplified above for the polyorganosiloxane (A) and also vinyl radicals. Among them, methyl radicals are preferred in view of the ease of their synthesis and the thermal resistance of the cured product. Although the average polymerization degree is not particularly limited, a polymerization degree in the range of 4 to 3,000 is employed in general and is preferred. If the average polymerization degree is less than 4, the volatility of the composition is too high for convenient handling. Those having an average polymerization degree of higher than 3,000 cannot be synthesized easily. The hydrogen atoms Si-H can be bonded to the same or different silicon atoms.

The amount of component (B) is in the range of 0.1 to 10 parts by weight, per 100 parts by weight of polyorganosiloxane (A).

The fine transition metal powder (C) is used in the present invention for the purpose of imparting conductivity, X-ray shielding properties or other special properties required for special uses of the cured products. The transition metals include elements having atomic numbers of 21 (Sc) to 29 (Cu), 39 (Y) to 47 (Ag) and 57 (La) to 79 (Au), such as iron, cobalt, nickel, copper, molybdenum, silver and tungsten. Particularly, silver imparts conductivity to the cured products and tungsten imparts X-ray shielding properties thereto.

The fine transition metal powder (C) is used in an amount of 5 to 500 parts by weight, preferably 5 to 100 parts by weight, per 100 parts by weight of polyorganosiloxane (A). If the amount of component (C) is less than 5 parts by weight, the purpose (intended properties) cannot be attained. If the amount of component (C) is more than 500 parts by weight, the mechanical properties of the cured product are degraded.

The platinum catalyst (D) used in the present invention does not contain any halogen atoms in the molecule. The platinum catalyst (D) is, for example, a 0 (zero)-valent platinum-phosphorus complex or bis (acetylacetonato) platinum (II). The platinum catalysts containing chlorine atom in the molecule generally used for those reactions, such as chloroplatinic acid; complexes thereof with alcohols, olefins and vinyl group-containing siloxanes; and divalent platinum-phosphorus complexes, cannot be used for the purposes of the present invention, because vulcanization inhibition or scorching is caused, in the presence of the fine transition metal powder. The 0 (zero)-valent platinum-phosphorus complexes are represented by the general formula:

wherein R represents a monovalent radical selected from the group consisting of monovalent hydrocarbon radicals, alkoxy radicals and aryloxyradicals. They include, for example, platinum tetrakis(triethylphosphine), platinum tetrakis(tributylphosphine), platinum tetrakis(triphenylphosphine), platinum tetrakis(trimethylphosphite), platinum tetrakis (triethylphosphite), platinum tetrakis(tributylphosphite) and platinum tetrakis(triphenylphosphite). Bis (acetylacetonato) platinum (II) is represented by the formula:

wherein "acac" represents acetylacetonato.

The component (D) is used in a catalytic amount, preferably in the range of 0.1 to 1,000 ppm, based on the polyorganosiloxane (A). This amount should be selected carefully, because the suitable amount thereof varies depending on the type and the amount of the fine transition metal powder that is used. A suitable amount, for any particular composition, can be determined by detailed experimentation.

Although it is the essential, distinctive feature of the present invention that the composition is obtained by incorporating components (B)–(D) in component (A), when the mechanical properties of the composition are to be further improved, it is preferred to incorporate additional, inorganic fine powders therein. As the inorganic fine powders, fine silica powders are preferred, because they have a high reinforcing effect and they exert no influence on the platinum catalyst. As the fine silica powders, there can be mentioned, for example, fumed silica, precipitated silica and calcined silica. Those fine silica powders exert bad influences on the processability of the composition and the electric properties and mechanical properties of the cured product, due to the polarity and hydrophilic properties of silanol radicals which are present in a large quantity on the surfaces thereof. Thus, depending on the use of the cured product, it is recommended to pretreat the surfaces of the fine silica powders with an organosilicon compound, such as a linear polyorganosiloxane, cyclic polyorganosiloxane or hexamethyldisilazane. When the reinforcing effect is not required, but only hardness is to be increased, silica particles of relatively large particle diameters, such as ground quartz, can be used. The fine silica powders are used preferably in an amount in the range of 10 to 100 parts by weight per 100 parts by weight of polyorganosiloxane (A). If the amount of the silica is less than 10 parts by weight, the reinforcing effect cannot be obtained and, on, the other hand, if it is more than 100 parts by weight, the incorporation process will be difficult and the hardness of the resulting product will be excessive.

The composition of the present invention can further contain process aids, such as low molecular polyorganosiloxanes having hydroxyl and alkoxyl radicals at the terminals thereof. Moreover, the composition of the present invention can contain a thermal stabilizer such as ferrous octoate and ferric oxide.

Thus, according to the present invention, the industrial scale production of cured silicone products containing fine powders of transition metals, such as silver and tungsten, is possible. The composition of the present invention can be stored stably for a long period of time and it can be cured by heating for only a short time to form a resinous or elastomeric, cured silicone product containing a fine transition metal powder.

The composition of the present invention can be used to make conductive silicone elastomers or silicone resins, X-ray shielding plates, X-ray contrast catheters and other contrast media.

The following illustrative examples further describe the present invention. In the examples, the term "parts" means parts by weight. The symbols have the following meanings:

Et: ethyl, Bu: butyl,
Ph: phenyl, acac: acetylacetonato.

EXAMPLE 1

100 parts of polyorganosiloxane (comprising 0.2 mole % of methylvinylsiloxy units and 99.8 mole % of dimethylsiloxy units) having an average polymerization degree of 7,000, end-blocked with trimethylsiloxy units, 50 parts of fumed silica, the surface of which had been pretreated with siloxane, and 15 parts of fine tungsten powder having an average particle diameter of 2 microns were kneaded together in a dough mixer to obtain a base composition. To the base composition there were added and blended polymethylhydrogensiloxane (comprising 60 mole % of methylhydrogensiloxy units and 40 mole % of dimethylsiloxy units) end-blocked with trimethylsiloxy units and having a viscosity at 25° C. of 30 cSt, and a catalyst, by means of rollmilling, whereby to obtain compositions 11–18 as shown in Table 1. Compositions 13 and 16 are compositions according to the present invention and other compositions in Table 1 are comparative compositions.

TABLE 1

| Composition No. | Polyorganohydrogensiloxane Amount (part) | Catalyst and inhibitor Compound | Amount *1 |
|---|---|---|---|
| 11 (Comparison) | 1 | Chloroplatinic acid | 10 ppm |
| 12 (Comparison) | 1 | Pt[P(OBu)$_3$]$_2$Cl$_2$ | 10 ppm |
| 13 (Invention) | 1 | Pt[P(OPh)$_3$]$_4$ | 10 ppm |
| 14 (Comparison) | 1 | Reaction product of chloroplatinic acid and octanol Methyl ethyl ketone peroxide *2 | 10 ppm 1,000 ppm |
| 15 (Comparison) | 1 | Reaction product of chloroplatinic acid and tetramethyltetravinylcyclotetrasiloxane 3-Hydroxy-3-methyl-1-butyne *2 | 1,000 ppm |
| 16 (Invention) | 1 | Pt(acac)$_2$ | 10 ppm |
| 17 (Comparison) | 0 | Di-tert-butyl peroxide | 1.0% |
| 18 (Comparison) | 0 | 2,4-Dichlorobenzoyl peroxide | 1.0% |

(Note)
*1 based on the polyorganosiloxane
*2 inhibitor

The following experiments and observations were made for those compositions:

(1) Change in the state of the composition during the mixing by the roll mill was observed.
(2) After catalyzing, $T_{90}$ and torque of the composition were measured with "JSR type Curastometer" (trade name; a product of Imanaka Kikai Kogyo Kabushiki Kaisha) at 170° C.
(3) After mixing, the storage stability of the composition was observed at room temperature.
(4) After mixing at room temperature and storage at 50° C. for a period of time as shown in Table 2, $T_{90}$ and torque of the composition were measured.
(5) Press-cured at 170° C. for 10 minutes.
(6) Hot air vulcanized at 250° C.
(7) Physical properties of the composition press-cured in the above treatment (5) were measured (only for compositions 13 and 16).

Results of experiments (1)–(6) are shown in Table 2 and results of experiment (7) are shown in Table 3.

TABLE 2

| Composition No. | Experiment (2) $T_{90}$ (sec.) | Experiment (2) Torque Kg. cm | Experiment (4) Storage time | Experiment (4) $T_{90}$ (sec.) | Experiment (4) Torque Kg. cm | Other Experiments Experiment No. | Other Experiments Results |
|---|---|---|---|---|---|---|---|
| 11 (Comparison) | — | Not increased | — | — | — | (1) (5) (6) | Partial gelation Elastomer could not be obtained Elastomer could not be obtained |
| 12 (Comparison) | 272.0 | 45.3 | 20 mins. | ∞ (after 30 mins.) | 10.2 | (5) | Elastomer could not be obtained after allowing to stand at room temperature for one hour |
| 13 (Invention) | 132.0 | 48.0 | 3 days | 138.4 | 47.8 | (3) (5) (6) | No change Elastomer was obtained Elastomer was obtained |
| 14 (Comparison) | 112.3 | 49.9 | — | — | — | (3) | Cured in one hour |
| 15 (Comparison) | 32.0 | 40.0 | — | — | — | (3) | Cured in one hour |
| 16 (Invention) | 72.8 | 47.9 | 1 day | 71.0 | 48.7 | (3) (5) (6) | No change Elastomer was obtained Elastomer was obtained |
| 17 (Comparison) | | | | | | (5) | No curing at all |
| 18 (Comparison) | | | | | | (6) | No curing at all |

TABLE 3

| Composition No. | 13 | 16 |
|---|---|---|
| Hardness (JIS) | 72 | 74 |
| Tensile strength Kg/cm$^2$ | 61 | 58 |
| Elongation % | 340 | 310 |
| Tear strength Kg/cm | 16 | 14 |

TABLE 3-continued

| Composition No. | 13 | 16 |
| --- | --- | --- |
| (JIS type) | | |

Example 2

100 parts of polyorganosiloxane (comprising 0.1 mole % of methylvinylsiloxy units and 99.9 mole % of dimethylsiloxy units) having an average polymerization degree of 5,000, end-blocked with dimethylvinylsiloxy units, 40 parts of fumed silica, the surface of which had been treated with hexamethyldisilazane, 10 parts of fine tungsten powder of an average diameter of 5 microns and 2.5 parts of α, ω-dimethoxypolydimethylsiloxane having a viscosity at 25° C. of 30 cSt were kneaded together in a dough mixer to obtain a base composition. To the base composition there were added and blended one part of poly(methylhydrogensiloxane), end-blocked with trimethylsiloxy units, having a viscosity at 25° C. of 35 cSt, and a catalyst as shown in Table 4, by means of a roll mill, whereby to obtain compositions 21–23. Composition 23 is a comparative composition. Those compositions were allowed to stand at 50° C. for one day and then they were extruded to obtain a silicone rubber tube having an outer diameter of 2 mm and an inner diameter of 1 mm, which was subjected to hot air vulcanization at 250° C. Excellent silicone rubber tubes were obtained from the compositions of the present invention as shown in Table 4.

TABLE 4

| | Catalyst | | Results of extrusion |
| --- | --- | --- | --- |
| Composition No. | Compound | Amount ppm* | and not air vulcanization |
| 21 (Invention) | $Pt[P(OBu)_3]_4$ | 4 | Elastomer was obtained |
| 22 (Invention) | $Pt[PPh_3]_4$ | 4 | Elastomer was obtained |
| 23 (Comparison) | Reaction product of chloroplatinic acid and octanol | 4 | Extrusion was impossible |

(Note):
*based on polyorganosiloxane

EXAMPLE 3

A base composition was obtained in the same manner as in Example 2, except that 60 parts of fine silver powder of an average particle diameter of 10 microns were used in place of the fine tungsten powder. To the base composition there were added and blended 1.5 parts of polymethylhydrogensiloxane, and 6 ppm, based on the polyorganosiloxane, of $Pt[P(OPh)_3]_4$ by means of a roll mill whereby to obtain a composition. The composition was allowed to stand at 50° C. for 3 days and then it was extruded and hot air vulcanized in the same manner as described in Example 2. There was obtained an excellent silicone rubber tube. Besides, a silicon rubber obtained by the press-curing of the composition at 170° C. for 10 minutes, followed by after-curing at 200° C. for 4 hours, had a volume resistivity of $2 \times 10^{-3}$ Ω·cm.

EXAMPLE 4

A base composition was obtained in the same manner as described in Example 2, except that a polyorganosiloxane (comprising 0.15 mole % of methylvinylsiloxy units, 5 mole % of diphenylsiloxy units and the remainder of dimethylsiloxy units), having an average polymerization degree of 6,000, end-blocked with hydroxyl groups, was used. To the base composition there were added and blended 2 parts of a polyorganohydrogensiloxane (comprising 1 mole % of methylvinylsiloxy units, 40 mole % of methylhydrogensiloxy units and the remainder of dimethylsiloxy units), end-blocked with trimethylsilyl units, having a viscosity at 25° C. of 100 cSt, and 5 ppm, based on the polyorganosiloxane, of $Pt[P(OEt)_3]_4$ by means of a roll mill to obtain a composition. The extrusion and hot air vulcanization were performed in the same manner as described in Example 2. An excellent silicone rubber tube was obtained.

EXAMPLE 5

100 parts of polyorganosiloxane (comprising 0.2 mole % of methylvinylsiloxy units and 99.8 mole % of dimethylsiloxy units) having an average polymerization degree of 7,000, end-blocked with trimethylsiloxy units, 40 parts of fine tungsten powder having an average particle diameter of 2 microns and 1.5 parts of the polymethylhydrogensiloxane used in Example 1 were kneaded together, and then 10 ppm, based on the polyorganosiloxane, of $Pt[P(OBu)_3]_4$ was further blended therein to obtain a composition. The composition was subjected to press-curing at 170° C. for 10 minutes to obtain a silicone rubber.

EXAMPLE 6

100 Parts of poly(dimethylsiloxane), end-blocked with dimethylvinylsiloxy units, having a viscosity at 25° C. of 3,000 cSt were charged in a universal blender. 10 parts of fumed silica, the surface of which had been treated with hexamethyldisilazane, and 50 parts of ground quartz were mixed therein. Then, 50 parts of fine silver powder of an average particle diameter of 6 microns were added thereto and the whole was kneaded to obtain a base composition. To the base composition there was added and blended 2 parts of polymethylhydrogensiloxane and a catalyst as listed in Table 5, whereby to obtain compositions 61–63. Composition 61 is a comparative composition. The curing properties and the change thereof with passing of time at 100° C. were measured with JSR type Curastometer (trade name, a product of Imanaka Kikai Kogyo Kabushiki Kaisha). The results are shown in Table 5.

TABLE 5

| | Catalyst | | Conditions of storage | | Results of measurement | |
| --- | --- | --- | --- | --- | --- | --- |
| Composition No. | Compound | Amount ppm* | Temp °C. | Time | $T_{90}$ sec. | Torque Kg. cm |
| 61 (Comparison) | Chloroplatinic acid | 10 | Room temp. | 10 mins. | 90.0 | 25.3 |
| | | | Room temp. | 30 mins. | | Not increased |
| 62 (Invention) | $Pt[P(OBu)_3]_4$ | 10 | Room temp. | 1 hr. | 200.0 | 24.8 |
| | | | 50 | 2 days | 198.4 | 25.1 |

TABLE 5-continued

| Composition No. | Catalyst | | Conditions of storage | | Results of measurement | |
|---|---|---|---|---|---|---|
| | Compound | Amount ppm* | Temp °C. | Time | $T_{90}$ sec. | Torque Kg. cm |
| 63 (Invention) | Pt(acac)$_2$ | 10 | Room temp. | 1 hr. | 228.2 | 25.6 |
| | | | 50 | 2 days | 211.3 | 25.9 |

(Note)
*based on polyorganosiloxane

EXAMPLE 7

75 Parts of polydimethylsiloxane, end-blocked with dimethylvinylsiloxy units, having a viscosity at 25° C. of 10,000 cSt, 25 parts of polyorganosiloxane (comprising 60 mole % of trimethylsiloxy units, 30 mole % of SiO$_2$ units and 10 mole % of methylvinylsiloxy units) having an average silicon number of 200, 30 parts of ground quartz, 3 parts of silica precipitate and 10 parts of fine tungsten powder of an average particle diameter of 2 microns were blended together to obtain a base composition. To the base composition there was added and blended 2.5 parts of 1,3,5,7-tetramethyl-1-butylcyclotetrasiloxane and 20 ppm, based on the sum of the polyorganosiloxanes, of Pt[P(OPh)$_3$]$_4$ whereby to obtain a composition. The composition was interposed between two polytetrafluoroethylene sheets and heated to 140° C. for 30 minutes to obtain a tungsten-containing silicone rubber sheet.

The embodiments of the invention in which an exclusive property or privilege is claimed are defined as follows:

1. A curable composition consisting essentially of:
  (A) 100 parts by weight of polyorganosiloxane containing at least 2 vinyl radicals bonded to silicon atom(s) in the molecule,
  (B) 0.1 to 10 parts by weight of polyorganohydrogensiloxane containing more than 2 hydrogen atoms bonded to silicon atom(s), on the average, in the molecule,
  (C) 5 to 500 parts by weight of fine, tungsten, powder, and
  (D) a catalytic amount of a platinum catalyst containing no halogen atoms in the molecule.

2. A composition according to claim 1 which yields an elastomer by curing.

3. A composition according to claim 1 wherein the remainder of organic radicals bonded with silicon atoms in polyorganosiloxane (A), except for said vinyl radicals, are methyl radicals.

4. A composition according to claim 1 wherein said vinyl radicals are contained in an amount of 0.005 to 0.5 mol %, on the average, based on the total organic radicals bonded with silicon atoms in polyorganosiloxane (A).

5. A composition according to claim 1 wherein the average polymerization degree of polyorganosiloxane (A) is in the range of 100 to 10,000.

6. A composition according to claim 1 wherein said polyorganosiloxane (A) is end-blocked with dimethylvinylsiloxy groups.

7. A composition according to claim 1 wherein said platinum catalyst (D) is used in an amount of 0.1 to 1,000 ppm, based on polyorganosiloxane (A).

8. A composition according to claim 1 wherein said platinum catalyst (D) is a 0(zero)-valent platinum-phosphorus complex having the formula:

Pt[PR$_3$]$_4$ wherein R is a monovalent radical selected from the group consisting of monovalent hydrocarbon radicals, alkoxy radicals and aryloxy radicals.

9. A composition according to claim 1 wherein said platinum catalyst (D) is bis(acetylacetonato) platinum (II) of the formula:

Pt(acac)$_2$ wherein "acac" represents acetylacetonato.

10. A composition according to claim 1 which further contains 10 to 100 parts by weight of fine powder of silica.

11. A composition according to claim 10 wherein said fine powder of silica has been surface-treated with an organosilicon compound selected from the group consisting of polyorganosiloxanes and hexamethyldisilazane.

12. A cured article of the composition defined in claim 1.

13. A composition according to claim 1 wherein said platinum catalyst is Pt[P(OPh)$_3$]$_4$, Pt[P(OBu)$_3$]$_4$ or Pt[P(Ph)$_3$]$_4$, wherein Ph is phenyl and Bu is butyl.

* * * * *